June 15, 1937.  H. GORKE  2,083,648
PREPARATION OF ALKALI METAL HYDROXIDE SOLUTIONS
Filed Jan. 27, 1933
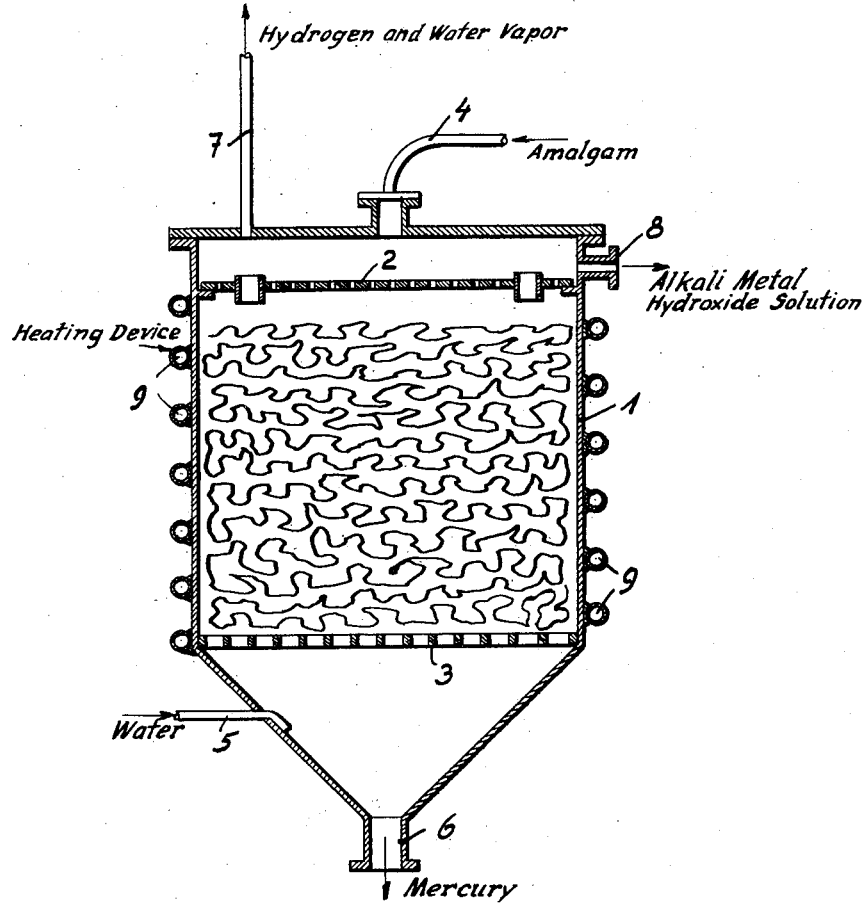

Patented June 15, 1937

2,083,648

UNITED STATES PATENT OFFICE 2,083,648

PREPARATION OF ALKALI METAL HYDROXIDE SOLUTIONS

Herbert Gorke, Leverkusen-I. G. Werk, Germany, assignor to I. G. Farbenindustrie Aktiengesellschaft, Frankfort-on-the-Main, Germany Application January 27, 1933, Serial No. 653,904
In Germany February 25, 1932

4 Claims. (Cl. 23—184)

The present invention relates to a process of preparing concentrated alkali metal hydroxide solutions by reacting upon alkali metal amalgam with water in the presence of suitable catalysts, whereby the amalgam and the water react one upon the other in counter-current at an elevated temperature.

According to known processes alkali metal hydroxide solutions of at most 35% strength can be obtained, for instance, by reacting upon amalgam with water in the presence of catalysts. The resulting solutions cannot be shipped as such, but must be concentrated. Up to the present time it has been impossible to obtain more concentrated lyes from amalgam by direct contact with water, though many attempts have been made in this respect.

I have found that concentrated lyes can be obtained from amalgams by reacting upon alkali metal amalgam with water and carrying out the process while passing the water and the amalgam in counter-current over suitable catalysts at an elevated temperature. Any alkali metal amalgam can be used; I prefer to employ the amalgam obtained from alkali metal chloride by electrolysis. As catalysts, for instance, graphite, coke, carbon and iron, and alloys of iron with nickel and/or chromium come into consideration. The temperature required for performing the reaction lies between about 30° and 100° C., care must be taken that it is always high enough to prevent the crystallization of the concentrated lye obtained. In general, the reaction temperature is high enough to avoid any crystallization in the apparatus; in some cases it is of advantage to heat or cool the apparatus. The alkali metal hydroxide solution obtained contains up to 70% of NaOH in the case of sodium amalgam, and in the case of potassium amalgam it contains even more, for instance, 75% of KOH. The lyes obtained are ready for use, no further concentration by evaporation being necessary. They can be shipped without further treatment since the concentration is the commercial one. It is understood that the apparatus can also be used for the preparation of thinner lyes.

The following example illustrates one method of execution of my new process, the invention is, however, not restricted thereto nor to the apparatus described. The figures as given in the example refer to the accompanying drawing.

*Example.*—A 100 liter sheet iron tower (1) is provided with a sieve plate (2) and a perforated sheet (3). At the top of the container a pipe (4) is provided by which 8000 kgs. of sodium amalgam of 0.1% Na are introduced per hour. The amalgam trickles through the sieve plate and over the graphite pieces with which the tower is filled, whereby it is finely divided. It is decomposed by water which is introduced at the bottom of the apparatus through pipe (5) at the rate of 19.5 kgs. per hour. The apparatus by the reaction temperature is heated to about 60° C. The mercury leaves the apparatus through pipe (6). The hydrogen which develops during the reaction escapes through pipe (7), and the sodium hydroxide solution of 60% strength leaves the apparatus through pipe (8). Pipe (9) constitutes a heating device.

I claim:—

1. Process of preparing concentrated alkali metal hydroxide solutions which comprises trickling a stream of an alkali metal amalgam downwardly through a tower over and in contact with a mass of relatively small pieces of a solid catalyst so arranged in the tower in the path of said stream as to finely subdivide said stream while passing a stream of water upwardly through said mass of catalyst and maintaining a temperature within said mass of between about 60° C. and about 100° C. and separately withdrawing from said tower the resulting alkali metal hydroxide solution, hydrogen gas and mercury.

2. Process as defined in claim 1 in which the catalyst mass is a tower filling of pieces of graphite.

3. Process as defined in claim 1 in which the alkali metal amalgam is sodium amalgam.

4. Process as defined in claim 1 in which the alkali metal amalgam is potassium amalgam.

HERBERT GORKE.